United States Patent
Cross

(10) Patent No.: US 10,343,763 B2
(45) Date of Patent: Jul. 9, 2019

(54) LIFTING SURFACES AND ASSOCIATED METHOD

(71) Applicant: Airbus Operations Limited, Bristol (GB)

(72) Inventor: Murray Cross, Bristol (GB)

(73) Assignee: Airbus Operations Limited, Bristol (GB)

( * ) Notice: Subject to any disclaimer, the term of this patent is extended or adjusted under 35 U.S.C. 154(b) by 850 days.

(21) Appl. No.: 14/975,493

(22) Filed: Dec. 18, 2015

(65) Prior Publication Data

US 2016/0176506 A1 Jun. 23, 2016

(30) Foreign Application Priority Data

Dec. 19, 2014 (GB) .................................. 1422790.4

(51) Int. Cl.
*B64C 9/00* (2006.01)
*B64C 27/46* (2006.01)
*F03B 3/12* (2006.01)
*F03D 1/06* (2006.01)
*F03D 7/02* (2006.01)
(Continued)

(52) U.S. Cl.
CPC ............... *B64C 9/00* (2013.01); *B64C 23/076* (2017.05); *B64C 27/463* (2013.01); *F03B 3/123* (2013.01); *F03D 1/0633* (2013.01); *F03D 7/0228* (2013.01); *F04D 29/28* (2013.01);
(Continued)

(58) Field of Classification Search
CPC .... B64C 9/00; B64C 9/10; B64C 9/12; B64C 9/323; B64C 23/072; B64C 23/076; B64C 23/065; B64C 23/069; B64C 23/06; B64C 27/463; B64C 27/467; F03D 7/0228;
(Continued)

(56) References Cited

U.S. PATENT DOCUMENTS 5,156,358 A 10/1992 Gerhardt
5,823,480 A 10/1998 La Roche
(Continued)

FOREIGN PATENT DOCUMENTS

DE 2149956 4/1973
DE 19926832 1/2001
(Continued)

OTHER PUBLICATIONS

Extended Search Report and Opinion cited in European Patent Application No. 15198369.9 dated May 17, 2016, 12 pages.
(Continued)

*Primary Examiner* — Jason D Shanske
*Assistant Examiner* — Maxime M Adjagbe
(74) *Attorney, Agent, or Firm* — Nixon & Vanderhye P.C.

(57) ABSTRACT

An arrangement of lifting surfaces including a primary lifting surface having a flexural axis extending in the spanwise direction of the lifting surface, a root, and a tip. A first tip device is attached to the tip and has a first lifting surface. A second tip device is attached to the tip and has a second lifting surface. A control system is coupled to the first and second tip devices for moving the first and second lifting surfaces relative to the tip or for actively controlling circulation of the first and second lifting surfaces. The control system is operable to change a value of torque effective at the primary lifting surface about the flexural axis.

38 Claims, 7 Drawing Sheets

(51) Int. Cl.
    *F04D 29/28*     (2006.01)
    *F04D 29/38*     (2006.01)
    *B64C 23/06*     (2006.01)

(52) U.S. Cl.
    CPC ............ *F04D 29/38* (2013.01); *Y02E 10/721* (2013.01); *Y02T 50/164* (2013.01)

(58) Field of Classification Search
    CPC .... F03D 7/0232; F03D 7/0236; F03D 1/0633; Y02T 50/164; F04D 29/28; F03B 3/123
    See application file for complete search history.

(56) References Cited

U.S. PATENT DOCUMENTS

| | | | |
|---|---|---|---|
| 6,220,551 B1 * | 4/2001 | Saiz | B64C 9/10 244/217 |
| 6,345,790 B1 | 2/2002 | Brix | |
| 7,900,876 B2 * | 3/2011 | Eberhardt | B64C 23/069 244/199.4 |
| 9,108,725 B1 * | 8/2015 | Shmilovich | B64C 21/04 |
| 2002/0060272 A1 | 5/2002 | La Roche et al. | |
| 2004/0000619 A1 | 1/2004 | Barriety | |
| 2006/0027703 A1 | 2/2006 | Bussom et al. | |
| 2006/0049307 A1 | 3/2006 | Schweiger | |
| 2008/0308683 A1 | 12/2008 | Sankrithi et al. | |
| 2009/0084904 A1 | 4/2009 | Detert | |
| 2009/0224107 A1 * | 9/2009 | McLean | B64F 5/00 244/199.4 |
| 2010/0135806 A1 | 6/2010 | Benito | |
| 2010/0259046 A1 * | 10/2010 | Kota | F03D 1/0641 290/44 |
| 2014/0064979 A1 | 3/2014 | Colling et al. | |

FOREIGN PATENT DOCUMENTS

| | | |
|---|---|---|
| EP | 1 127 786 | 8/2001 |
| GB | 2130159 | 5/1984 |
| GB | 2282996 | 4/1995 |
| GB | 2464658 | 4/2010 |

OTHER PUBLICATIONS

GB Search Report cited in GB1422790.4, dated Jun. 17, 2015, four pages.

* cited by examiner

LIFTING SURFACES AND ASSOCIATED METHOD

RELATED APPLICATION

This application claims priority to Great Britain (UK) application 1422790.4 filed on Dec. 19, 2014, the entirety of which is incorporated by reference.

FIELD OF THE INVENTION

The present invention relates to an arrangement of lifting surfaces and a method of actively controlling lift level and/or lift distribution thereof.

BACKGROUND OF THE INVENTION

In the design of lifting surfaces, e.g. wings of fixed wing aircraft, blades of rotary wing aircraft, blades of wind turbines, etc., a design point is generally chosen corresponding to a particular theoretical operating condition. The design point is often chosen as a mid-point of the operating regime. The shape of the lifting surface as manufactured is selected such that at the design point the lifting surface will deform to meet the anticipated shape at the design point.

One consequence of this design process is that at operating conditions other than the design point the shape of the lifting surface is likely to be aerodynamically sub-optimal. Moreover, even the theoretical operating condition corresponding to the design point may not be realised in practice.

Lifting surfaces are inherently flexible structures and a significant factor affecting the aerodynamic performance of the lifting surface is the tendency to twist and bend under aerodynamic loading. Local twist (local angle of attack) changes the local aerodynamic loading distribution, and this impacts the overall lifting surface lift, drag and moment characteristics. As an example, the lift induced drag of a lifting surface is dependent upon the spanwise lift distribution, which changes as the lifting surface twists and bends under load. In addition the necessary strength (and weight) of a lifting surface structure is dependent on the spanwise lift distribution—a lifting surface with a lift distribution more biased towards the wing tip will typically be heavier than one with a lift distribution more biased towards the lifting surface root, due to higher bending moments.

The flexural axis is defined as the line of shear centres of the aerofoil sections in the spanwise direction of the lifting surface, where the shear centre is the point in the section where a shear load causes no twist and a torque causes no bending.

Many fixed and rotary wings have an additional lifting surface, a so called "wing tip device", or "winglet", attached at the outboard end of the wing. These wing tip devices are typically designed to reduce lift induced drag. Wing tip devices may be fixed to the outboard end of the wing so as to be non-moveable, or may be moveable and actively controlled.

US 2006/0049307 describes a wing elastically deformable about an elastic axis and with an actively controlled surface at the wing tip for minimising the lift induced drag of the wing.

SUMMARY OF THE INVENTION

A first aspect of the invention provides an arrangement of lifting surfaces comprising a primary lifting surface having a flexural axis extending in the spanwise direction of the lifting surface, a root, and a tip; a first tip device attached to the tip and having a first lifting surface; and a second tip device attached to the tip and having a second lifting surface, and a control system coupled to the first and second tip devices for moving the first and second lifting surfaces relative to the tip and/or for actively controlling circulation of the first and second lifting surfaces; wherein the control system is operable to change a value of the torque effective at the primary lifting surface about the flexural axis.

A further aspect of the invention provides a method of controlling an arrangement of lifting surfaces, the arrangement comprising a primary lifting surface having a flexural axis extending in the spanwise direction of the lifting surface, a root, and a tip; a first tip device attached to the tip and having a first lifting surface; and a second tip device attached to the tip and having a second lifting surface, and a control system coupled to the first and second tip devices; the method comprising one or more of a) moving the first and second lifting surfaces relative to the tip, and b) actively controlling circulation of the first and second lifting surfaces so as to change a value of torque effective at the primary lifting surface about the flexural axis.

The first lifting surface may be moved mechanically independently of the second lifting surface.

The first lifting surface may be moved relative to the primary lifting surface in a first direction, and the second lifting surface may be moved relative to the primary lifting surface in a second direction opposite the first direction. This opposing movement may be achieved through a mechanical linkage between the first and second lifting surfaces, or the first and second lifting surfaces may be moved mechanically independently of one another.

The placement of the first and second lifting surfaces may maximise the distance between the respective surface centre of pressure (or lift) and the location of the primary lifting surface flexural axis in order to maximise the moment effective at the tip of the primary lifting surface about the flexural axis.

The control system may be operable in a first mode of operation in which the first and second lifting surfaces are actively controlled to change a value of torque effective at the primary lifting surface about the flexural axis whilst maintaining a value of lift generated by the first and second tip devices substantially constant.

The control system may also be operable in a second mode of operation in which the first and second lifting surfaces are actively controlled to change a value of lift generated by the first and second tip devices whilst maintaining a value of torque effective at the primary lifting surface about the flexural axis substantially constant.

The first and/or second lifting surfaces may extend full chord or only part chord of their respective tip devices.

The first and second lifting surfaces may be the same size and shape, or may be different to one another.

The first and/or second lifting surfaces may be rotated relative to the tip by an actuator, or respective actuators. The actuator(s) may control one or more of rotation (incidence) of the entirety of the first and second tip devices, rotation or movement (e.g. morphing, twist, etc.) of part of the tip devices, or may cause movement of fluid in active circulation control blown/suction devices, or other means of mechanical/aerodynamic control.

The first and second lifting surfaces may each include at least one aperture (e.g. a slot, a slit, or a row of holes) in fluid communication with an active circulation control blown/suction device. The lifting surfaces may be associated with respective active circulation control devices, or a common fluid reservoir may be used with valves to control the fluid movement through the aperture(s) of the respective lifting surfaces of the tip devices.

The control system actuators may be located at the tip of the primary lifting surface, or within the first and/or second lifting surfaces, or may be located elsewhere with a connection to the tip devices.

The first and/or second tip devices may be swept (forward or backwards), may be unswept (straight), or may have variable sweep across the span The primary lifting surface may be swept (forward or backwards), may be unswept (straight), or may have variable sweep across the span.

The sweep angle may be measured at the quarter chord line, or leading edge of the respective lifting surfaces in planform.

The first tip device may be located forward of the flexural axis and the second tip device may be located aft of the flexural axis.

Two or more actively controlled tip devices each having a lifting surface may be associated with each primary lifting surface, e.g. three or more tip devices, for controlling the torque effective at the primary lifting surface about the flexural axis.

The primary lifting surface may define a wing plane, and the first and second tip devices may be substantially co-planar with the wing plane. Alternatively, the first and second tip devices may be located in different planes, e.g. intersecting or parallel planes, or the tip devices may be curved The first and/or second tip devices may be mounted on a pylon, a strut or an additional surface extending from the tip of the primary lifting surface.

The primary lifting surface may be one of a wing of a fixed wing aircraft, a wing of a rotary wing aircraft, a wind turbine blade, a compressor blade, a propeller, or a hydrofoil.

In the case of an aircraft with port and starboard wings (primary lifting surfaces) the arrangement of lifting surfaces may be used for one or more of roll control of the aircraft; yaw control of the aircraft; pitch control of the aircraft; tip vortex control; and drag control. For example, the tip devices of the port and starboard wings may controlled to provide roll control thus diminishing or obviating aileron requirements; the tip devices may be used to provide differential tip drag with equal lift on the port and starboard wings to provide yaw control without roll; the tip devices may be used to trim the aircraft in pitch; the tip devices may be used to increase maximum drag for use on landing for example; and the tip devices may be used to destabilise the tip vortices to increase wake separation distances between aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
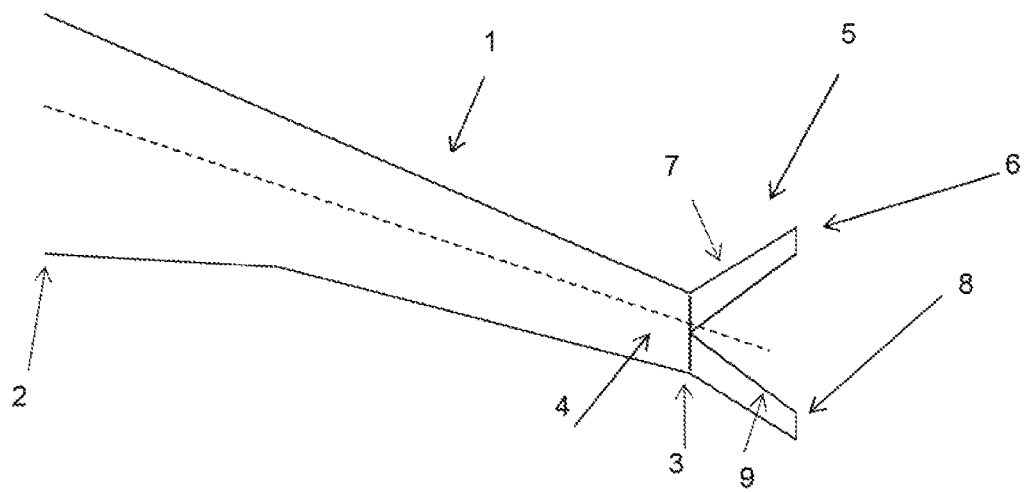
FIGS. 1a to 1c illustrate a primary lifting surface with a tip device according to a first embodiment.

In the first embodiment shown in FIGS. 1a to c, 2 and 3, a lifting surface 1 is arranged as a wing of a fixed wing aircraft, in particular a cranked, aft swept transonic wing, e.g. for a civil airliner. It will be appreciated that the lifting surface 1 may take a variety of different planform shapes and profiles depending on the particular application. In particular, the lifting surface 1 may have a straight trailing edge, may be un-swept or swept forwards (leading edge sweep or quarter chord sweep), and/or may have a curved leading and/or trailing edge.

The lifting surface 1 has a root 2 at the inboard end of the lifting surface and a tip 3 at the outboard end of the lifting surface. The flexural axis (elastic axis) of the lifting surface is indicated by broken line 4.

Attached to the tip 3 of the lifting surface is a tip device indicated generally by reference numeral 5. In the first embodiment the tip device 5 comprises a first tip device 6 attached to the tip 3 and having a first lifting surface 7 moveable relative to the primary lifting surface 1. The tip device 5 further comprises a second tip device 8 attached to the tip 3 and having a second lifting surface 9 moveable relative to the primary lifting surface 1. As best shown in FIG. 1b the first tip device 6 is substantially planar and the second tip device 8 is also substantially planar, and the first and second tip devices 6, 8 lie substantially co-planar with the plane of the primary lifting surface 1.

Figure 1B:
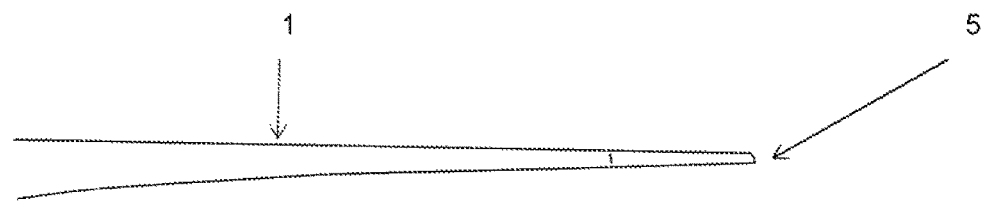
Figure 1C:
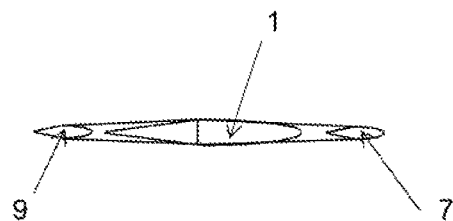

As best shown in FIGS. 1a and 1c the first tip device 6 is swept forwards and the second tip device 8 is swept backwards. The first tip device 6 has a leading edge which is swept forward with respect to the aft sweep of the leading edge of the primary lifting surface 1. The first tip device leading edge is also swept forward with respect to the spanwise direction (i.e. perpendicular to the chord) at the tip 3. The second tip device 8 has a leading edge swept aft with respect to the leading edge sweep of the primary lifting surface 1 and also swept aft with respect to the spanwise direction.

In other embodiments it may be desirable that the first tip device 6 is swept forward with respect to the leading edge sweep of the primary lifting surface 1 but is either un-swept or swept aft with respect to the spanwise direction. Also, it may be desirable that the second tip device 8 is swept aft with respect to the spanwise direction but is either un-swept or swept forward with respect to the leading edge of the primary lifting surface 1.

Figure 2:
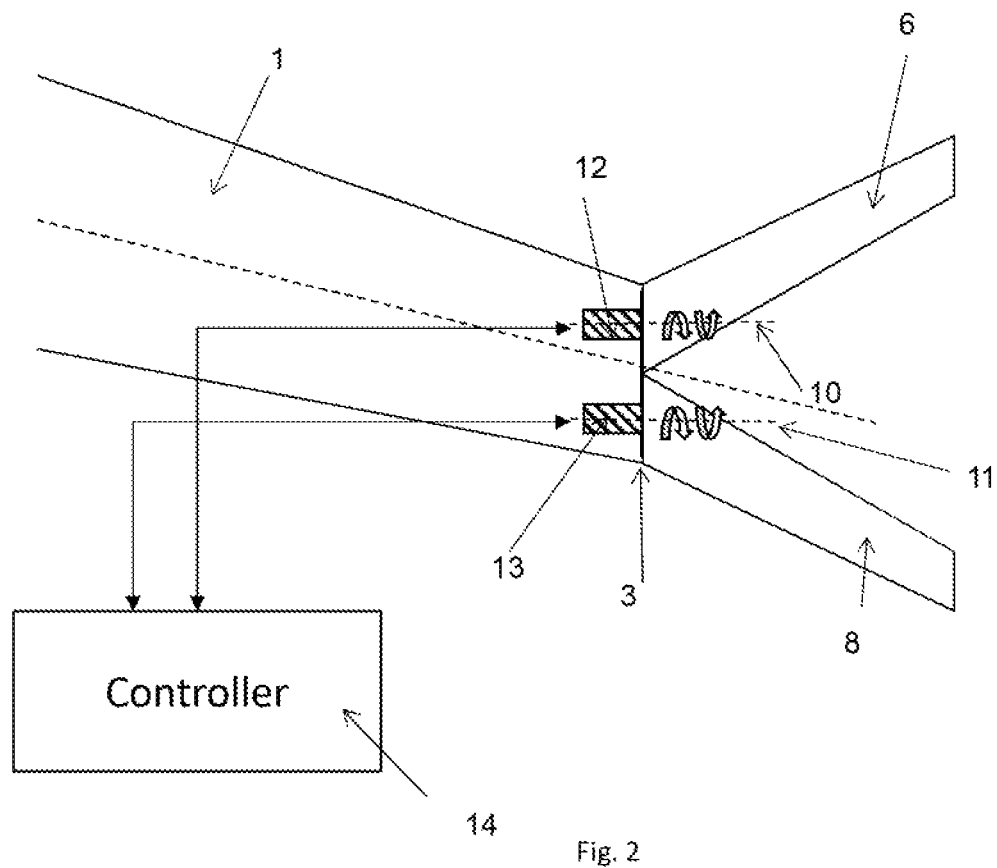
FIG. 2 illustrates a control system for the tip device of FIG. 1.

As shown in FIG. 2 the first tip device 6 is mounted for rotation about axis 10 extending perpendicular to the chordwise direction at the tip 3. Similarly, the second tip device 8 is mounted for rotation about axis 11 extending substantially perpendicular to the chordwise direction at the tip 3. A first actuator 12 mounted in the outboard end of the primary lifting surface 1 adjacent to the tip 3 is coupled to the first tip device 6 for rotating the first tip device 6 about axis 10.

A second actuator 13 is mounted in the outboard end of the primary lifting surface 1 adjacent to the tip 3 and is coupled to the second tip device 8 for rotating the second tip device 8 about axis 11. The actuators 12, 13 may be arranged as rotary actuators, for example.

The actuators 12 and 13 are connected to a control system 14. The control system 14 may either form part of, or be connected to, a flight control system (not shown) of the aircraft. The control system 14 is arranged for moving the first and second lifting surfaces 7, 9 relative to the tip 3. Movement of the first lifting surface is mechanically independent of movement of the second lifting surface, however for simplified versions of the device, a single actuator may be used to control both lifting surfaces.

The control system 14 is operable to move the first lifting surface 7 relative to the second lifting surface 9 to change a value of torque effective at the primary lifting surface 1 about the flexural axis 4. By changing the torque effective at the primary lifting surface about the flexural axis during flight it becomes possible to control the wing twist and hence the aerodynamic loading distribution across the primary lifting surface in the spanwise direction. The amount of torque generated by the tip device 5 is controlled by the control system 14, e.g. to optimise the twist distribution of the primary lifting surface according to operating and environmental conditions.

For example, during cruise, the twist of the wing may advantageously be set to provide minimum fuel burn (corresponding to maximum lift/drag ratio) for the instantaneous aircraft gross weight and weight distribution. For manoeuvres and gusts the twist may be set to minimise the loads effective at the wing or improve ride comfort. At high Mach numbers the tip device 5 may be used to counteract or delaying the unstable flutter point. In addition, by having independent control of each of the first and second tip devices 6, 8 it is possible to assist (i.e. make smaller) or even replace the function of flight control surfaces such as ailerons to enhance maneuvering capabilities or achieve the requisite capabilities with lower complexity and/or weight.

This wing loading control function of the wing tip device 5 is provided in addition to conventional vortex drag reduction associated with conventional tip devices. Since the torque generated through aerodynamic means by the tip device 5 is dependent on the force and the distance of the centre of pressure of the first and second lifting surfaces from the flexural axis 4, the configuration of the tip device 5 is optimised by arranging the tip device 5 as such that the first lifting surface 7 has a centre of pressure significantly offset from the flexural axis 4 in the forward direction (of the aircraft) and arranging the centre of pressure of the second lifting surface 9 at a significant offset from the flexural axis 4 in the aft direction.

The torque generated by each of the first and second tip devices 6, 8 is directly dependent on the aerodynamic lift (whether positive or negative lift) developed by their respective lifting surfaces 7, 9. It is to be expected that changing the angle of incidence (angle of attack) of one or both of the first and second lifting surfaces 7, 9 will directly affect the lift generated by the tip device 5 as a whole. The lift generated by the tip device 5 influences the bending of the primary lifting surface 1 as well as the vortex drag developed by the primary lifting surface and the tip device combined. In some circumstances it may be desirable to maintain the lift generated by the tip device 5 unchanged whilst altering the torque generated by the tip device 5 and therefore controlling the twist of the primary lifting surface 1. Similarly, it may be desirable under some circumstances to maintain the value of torque exerted on the primary lifting surface constant whilst changing the value of lift generated by the tip device 5 as a whole.

To this end, the control system is operable in a first mode in which the first and second lifting surfaces are moved relative to one another to change the value of torque effective at the primary lifting surface about the flexural axis whilst maintaining a value of lift generated by the first and second tip devices substantially constant. The control system may be operable in a second mode in which the first and second lifting surfaces are moved in the same direction to change a value of lift generated by the first and second tip devices whilst maintaining a value of torque effective at the primary lifting surface about the flexural axis substantially constant.

By operating the control system 14 in this way it becomes possible to, for example, maintain a substantially constant torque effective at the primary lifting surface by the tip device 5 whilst changing the lift generated by the tip device 5 to reduce loads or to perform a manoeuver such as a roll.

Figure 3:
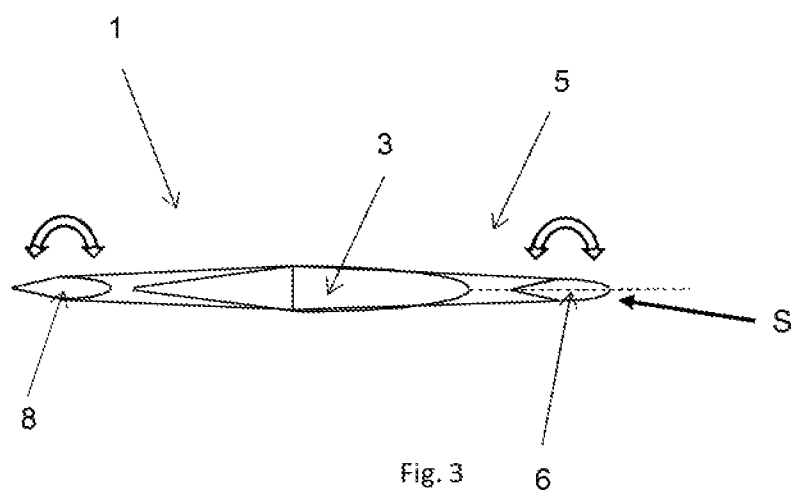
FIG. 3 illustrates the movement of the tip device of FIG. 1 under the control system.

FIG. 3 illustrates a side view of the primary lifting surface 1 having the tip device 5 illustrating how rotation of the first and second tip devices 6, 8 about their axis of rotation 10, 11 respectively varies the angle of incidence (angle of attack) of the respective first and second tip devices 6, 8 with respect to the free stream airflow, S.

For the tip device 5 to function most effectively the primary lifting surface 1 is required to be relatively flexible about the flexural axis 4. Otherwise, the torque generated by the device 5 will be largely ineffectual in controlling twist of the primary lifting surface from the root to the tip 3. However, it will be appreciated that structural constraints will limit the degree of torsional flexibility achievable for any given primary lifting surface.

Figure 4A:
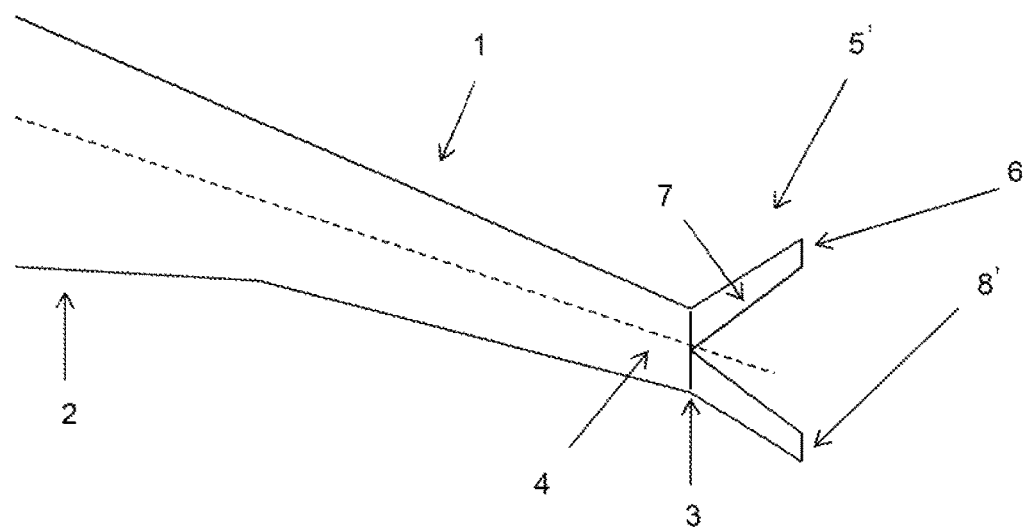
FIGS. 4a to 4c illustrate a primary lifting surface with a tip device according to a second embodiment.
Figure 4B:
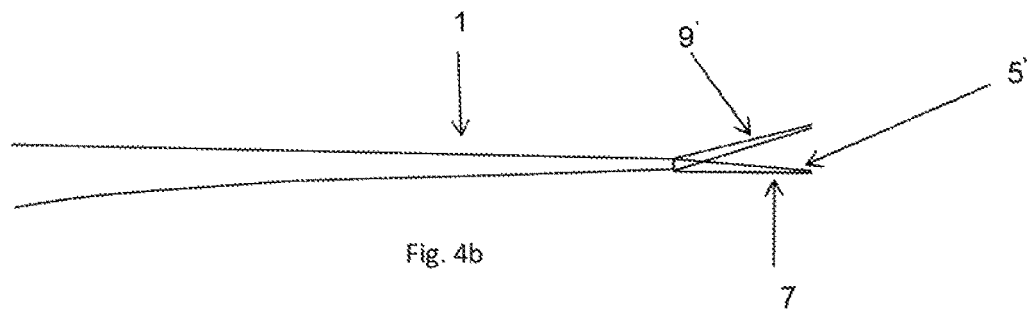
Figure 4C:
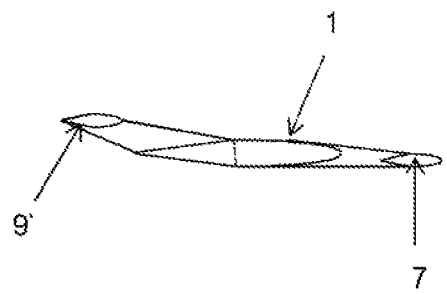

FIGS. 4*a* to 4*c* illustrate a second embodiment in which like reference numerals have been used to denote like parts and only those differences over the first embodiment will be described in detail below. In the second embodiment the tip device 5' comprises a first tip device 6 similar to the first embodiment and a second tip device 8' having a second lifting surface 9'. The tip device 5' differs from the tip device 5 of the first embodiment only in that the second tip device 8' extends out of the plane of the primary lifting surface 1, whereas the first tip device 6 remains in the plane of the primary lifting surface. This is best shown in FIGS. 4*b* and 4*c*. The second tip device 8' is attached to the tip 3 of the lifting surface 1 and extends upwardly and rearwardly from the tip 3. In all other respects the primary lifting surface 1 and the tip device 5' are identical to the primary lifting surface 1 and the tip device 5 of the first embodiment.

By positioning the second tip device so as to extend out of the plane of the primary lifting surface 1 so as to form an angle of approximately 10-30° with the plane of the primary lifting surface 1 the second tip device 8' avoids potential wake impingement effects from the first tip device 6 positioned forwardly of the second tip device 8'.

The control system and actuators for controlling movement of the first and second tip devices 6, 8', although not shown in FIGS. 4*a* to 4*c,* are identical to those shown in FIGS. 2 and 3 for the first embodiment to substantially the same effects.

Figure 5A:
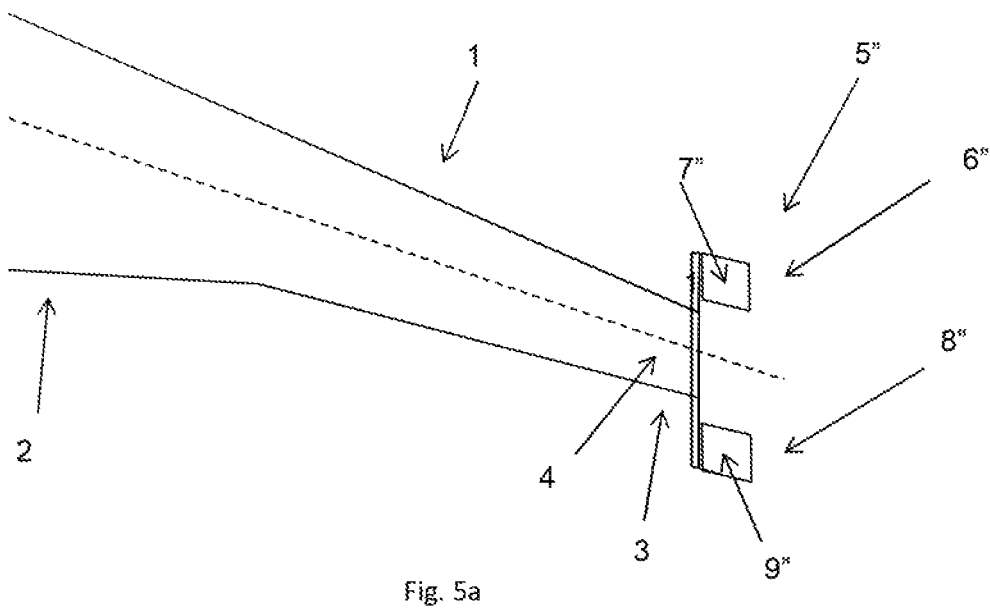
FIGS. 5a to 5c illustrate a primary lifting surface with a tip device according to a third embodiment.
Figure 5B:
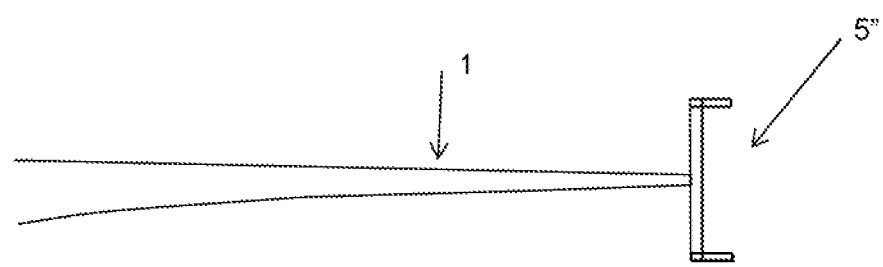
Figure 5C:
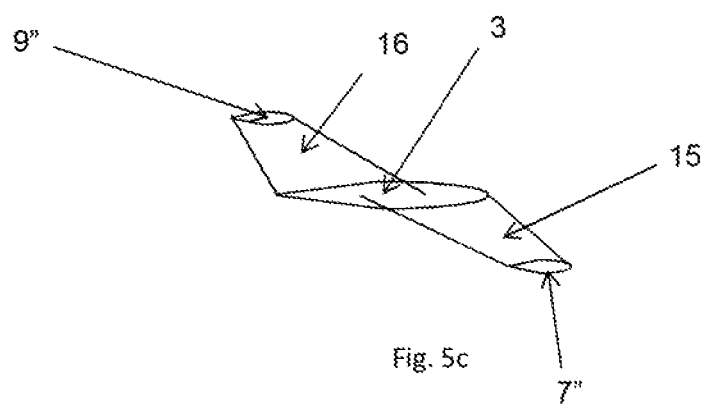

FIGS. 5*a* to 5*c* illustrate a third embodiment in which the primary lifting surface 1 is identical to that of the first embodiment and like reference numerals have been used to denote like parts with the first embodiment. Attached to the tip 3 of the primary lifting surface 1 is a tip device 5" comprising a first tip device 6" having a first lifting surface 7" moveable relative to the primary lifting surface 1, and a second tip device 8" attached to the tip 3 and having a second lifting surface 9" moveable relative to the primary lifting surface 1. Unlike the tip device 5 of the first embodiment, the tip device 5" of the third embodiment has the first and second tip devices 6" and 8" rotatably mounted on pylons (or "tip fence") 15, 16 respectively, as best shown in FIG. 5c. The first pylon 15 is attached to a forward portion of the tip 3. The second pylon 16 is attached to a rear portion of the tip 3. The pylons 15 and 16 extend substantially perpendicular to the plane of the primary lifting surface 1, i.e. in a substantially vertical direction when the aircraft is in steady level flight. The first pylon 15 extends downwardly and forwardly of the tip 3 and the second pylon 16 extends upwardly and rearwardly from the tip 3.

The first tip device 6" is mounted at the lower edge of the pylon 15 for rotation about a substantially spanwise axis. The second tip device 8" is mounted at the upper edge of the second pylon 16 for rotation about a substantially span wise axis. The first tip device 5" has a first lifting surface 7" with a substantially trapezoidal planform and aft swept leading and trailing edges. The second tip device 8" has a second lifting surface 9" with a substantially trapezoidal planform and aft swept leading and trailing edges.

Similar to the first embodiment, the first and second tip devices 6" and 8" are moved by actuators under a control system similar to that shown and described with respect to FIG. 2 relating to the first embodiment and to similar effects.

Figure 6:
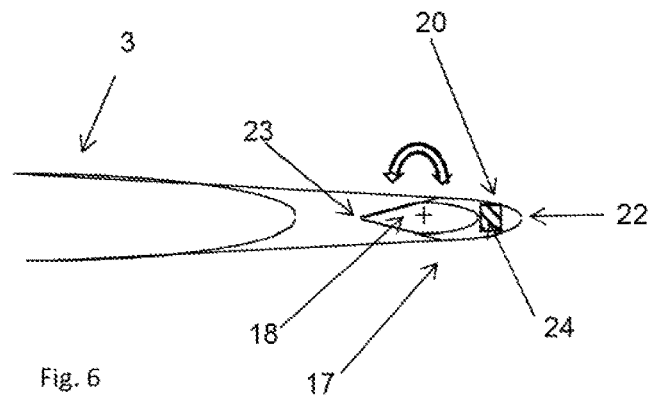
FIG. 6 illustrates a first alternative actuator for the control system of the first embodiment.

In each of the first to third embodiments described above, the first and second tip devices have a leading edge and a trailing edge and their respective lifting surfaces extend full chord between the leading and trailing edges. FIG. 6 illustrates an alternative arrangement which may be adopted in any of the first to third embodiments. In the arrangement shown in FIG. 6 the first tip device 17 has a moveable first lifting surface 18 and a fixed third lifting surface 20. The first lifting surface 18 extends only part chord between the leading edge 22 and the trailing edge 23 of the first tip device, and is positioned aft of the fixed lifting surface 20, although it may alternatively be positioned forward of it. An actuator 24 is arranged to move the first lifting surface 18 with respect to the third lifting surface 20. The second tip device (not shown) may be arranged similarly.

Figure 7:
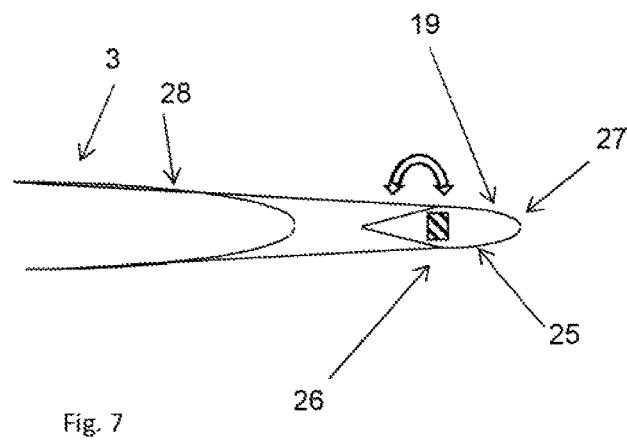
FIG. 7 illustrates a second alternative actuator for the control system of the first embodiment.

FIG. 7 illustrates a yet further arrangement of the tip device which may be employed in any of the first to third embodiments described above. In the arrangement shown in FIG. 7 the first tip device 19 has an actuator 26 arranged as a torque tube embedded within the aerofoil profile of the first lifting surface 25. The actuator 26 is configured for rotating the tip 27 of the first tip device 19 with respect to the root 28 thereof so as to twist the first lifting surface 25 along its length from the root end 28 to the tip end 27. This has the effect of changing the angle of the incidence (angle of attack) at the tip relative to the angle of the incidence at the root. The actuator for the torque tube may be located in the first tip device and/or the primary lifting surface. The second tip device may be arranged similarly. The torque tube or other actuator may be arranged to more generally morph the shape of the lifting surface to one of a plurality of desired shapes rather than simply twisting the lifting surface from root to tip.

Figure 8:
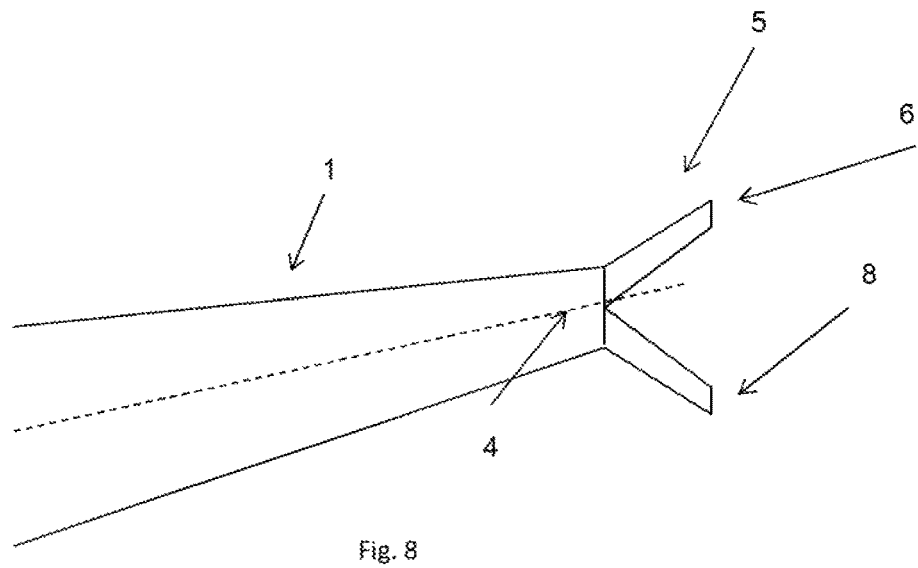
FIG. 8 illustrates an alternative primary lifting surface for the first embodiment.

FIG. 8 illustrates a yet further configuration in which the primary lifting surface 1' is swept forwardly and has straight leading and trailing edges. As shown in FIG. 8 the tip device 5 is identical to that of the first embodiment but it will be appreciated that any of the tip devices described above may be used in combination with the forward swept primary lifting surface 1' shown in FIG. 8. Forward swept wings do not naturally offer load alleviation and so are discounted for many applications. However, the invention provides control to counteract the load increases due to the structural configuration and so applications where forward swept wings would otherwise be beneficial are now realised.

High aspect ratio wings typically suffer the problem that structural weight becomes a limiting factor with respect to the maximum practical aspect ratio, and also the dynamic behaviour of the wing becomes more challenging to predict and control. The invention described herein has advantages in enabling higher aspect ratio wings than previously achievable in practice due to the active control at the tip.

The invention also opens up the possibility to create highly flexible (in torsion) wings. Whereas excessive torsion of the wing a static wing tip device would be undesirable, the active wing tip device control of the invention can accommodate and take advantage of highly flexible wing structures to allow large changes in wing shape across the flight envelope.

Figure 9A:
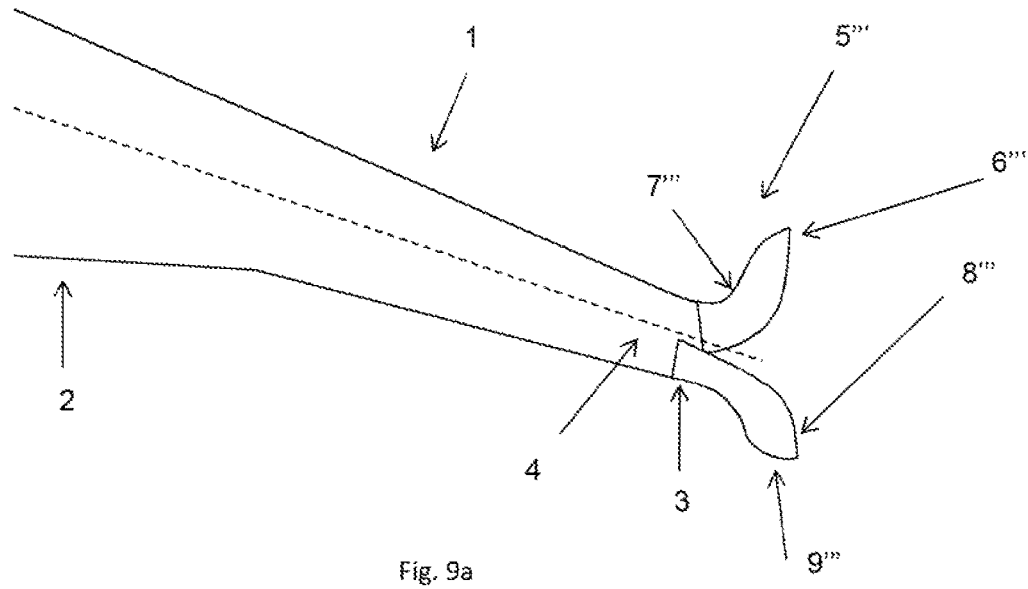
FIGS. 9a to 9c illustrate a primary lifting surface with a tip device according to a fourth embodiment.
Figure 9B:
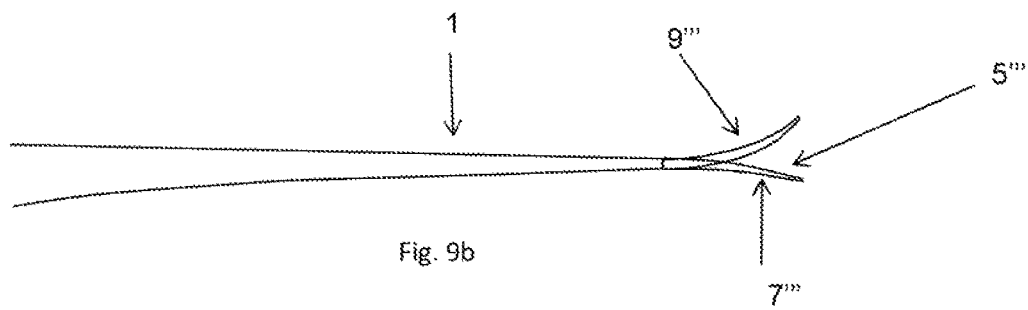
Figure 9C:
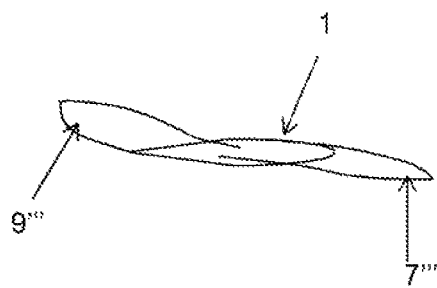

FIGS. 9a to 9c illustrate a fourth embodiment in which the primary lifting surface 1 is identical to that of the first embodiment and like reference numerals have been used to denote like parts with the first embodiment. Attached to the tip 3 of the primary lifting surface 1 is a tip device 5''' comprising a first tip device 6''' having a first lifting surface 7''' moveable relative to the primary lifting surface 1, and a second tip device 8''' attached to the tip 3 and having a second lifting surface 9''' moveable relative to the primary lifting surface 1. Unlike the tip device 5 of the first embodiment, the tip device 5''' of the fourth embodiment has the first and second tip devices 6''' and 8''' formed as curved "tip feathers".

The first lifting surface 7''' extends curving forwardly and downwardly from a forward portion of the tip chord. The second lifting surface 9''' extends curving rearwardly and upwardly from a rearward portion of the tip chord. In an alternative arrangement, the first lifting surface may curve forwardly and upwardly from the forward portion of the tip chord and the second lifting surface may curve rearwardly and downwardly from a rearward portion of the tip chord. The first and second lifting surfaces 7''' and 9''' have curved leading and trailing edges. The leading edge of the first lifting surface extends from the leading edge of the primary lifting surface at the tip and curves forwardly in an "S" curve towards the tip of the first tip device. The trailing edge of the first lifting surface sweeps forwardly in a continuous curve towards the tip of the first tip device. The trailing edge of the second lifting surface extends from the trailing edge of the primary lifting surface at the tip and curves rearwardly in an "S" curve towards the tip of the second tip device. The leading edge of the second lifting surface sweeps rearwardly in a continuous curve towards the tip of the second tip device.

The first and second tip devices are each mounted for rotation about a respective hinge line at the tip of the primary lifting surface 1. Unlike the first embodiment, the hinge lines are staggered and are inclined with respect to the free stream flow direction.

Similar to the first embodiment, the first and second tip devices 6''' and 8''' are moved by actuators under a control system similar to that shown and described with respect to FIG. 2 relating to the first embodiment and to similar effects. Alternatively, the part chord lifting surface, or the morphing/twisting lifting surfaces, described with respect to with respect to FIG. 7 may be used in combination with the tip feathers of the fourth embodiment.

Figure 10:
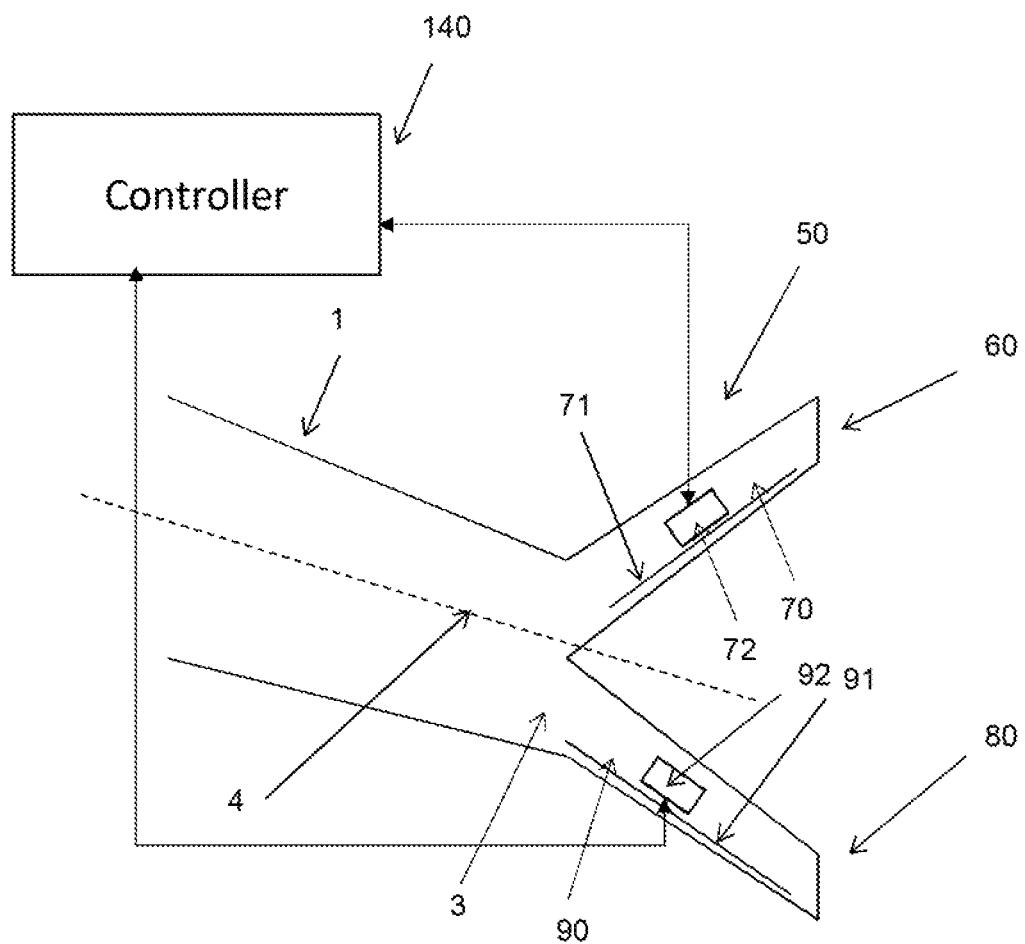
FIG. 10 illustrates a primary lifting surface with a tip device according to a fifth embodiment.

FIG. 10 illustrates a fifth embodiment in which the primary lifting surface 1 is identical to that of the first embodiment and like reference numerals have been used to denote like parts with the first embodiment. Attached to the tip 3 of the primary lifting surface 1 is a tip device 50 comprising a first tip device 60 having a first lifting surface 70, and a second tip device 80 attached to the tip 3 and having a second lifting surface 90. The shape of the first and second tip devices is identical to those of the first embodiment.

Unlike the tip device 5 of the first embodiment, the first and second lifting surfaces 70, 90 each include an aperture 71, 91. In the illustrated example the apertures 71, 91 are each a single straight slit (a narrow slot) in the respective low pressure (upper) surfaces of the first and second lifting surfaces 70, 90. Each aperture is fluidly coupled to an active circulation control device 72, 92 which ejects and/or admits fluid flow through the aperture. The apertures are located adjacent the trailing edge of the respective lifting surfaces in the illustrated example. The active circulation control devices 72, 92 are connected to a control system 140. The control system 140 may either form part of, or be connected to, a flight control system (not shown) of the aircraft.

Active circulation control devices are known in the art which eject a fluid into the boundary layer/airflow around the lifting surface, or which admit fluid from the boundary layer/airflow around the lifting surface, or which eject and admit fluid alternately. These devices include a fluid pump and a reservoir beneath the lifting surface to provide a suction and/or blown slot in that surface. By controlling the circulation the lift and/or lift distribution of the lifting surface is altered. Since the first and second lifting surfaces have a centre of pressure on either side of the wing flexural axis this change in lift/lift distribution can be altered to change a value of torque effective at the primary lifting surface about the flexural axis.

As an alternative to the single slit, the apertures may be one or more rows of slots or holes. The active circulation control may be used as an alternative to physically moving the first and second lifting surfaces to alter the lift/lift distribution and thereby change the value of torque effective at the primary lifting surface about the flexural axis, or further alternatively the active circulation control may be combined with the physically movable first and second lifting surfaces to further enhance the active aerodynamic control of the lift/lift distribution. As such the features of the fifth embodiment may be combined with those of any of the other embodiments described above.

The embodiments described above relate to wings of fixed civil airliners, but the invention has broad application to a variety of flexible lifting surfaces, including rotary wings (helicopter blades, where a tip torque device could assist the maneuverability and control of the rotor), wind turbines, compressor blades, propellers, gliders, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An arrangement of lifting surfaces comprising:
   a primary lifting surface including a flexural axis extending in the spanwise direction of the primary lifting surface, a root, and a tip;
   a first tip device attached to the tip and including a first lifting surface, and
   a second tip device attached to the tip and having a second lifting surface, and
   a control system coupled to the first and second tip devices configured to move the first and second lifting surfaces relative to the tip by moving at least one of the first and second tip devices relative to the primary lifting surface or actively control circulation of the first and second lifting surfaces;
   wherein the control system is configured to operate in a first mode to operably change a value of torque effective at the primary lifting surface about the flexural axis by actively controlling the first or second lifting surfaces while maintaining a substantially constant value of lift generated by the first and second tip devices.

2. The arrangement according to claim 1, wherein the first lifting surface is configured to be moved mechanically independently of the second lifting surface.

3. The arrangement according to claim 1, wherein the first lifting surface is configured to move relative to the primary lifting surface in a first direction, and the second lifting surface is configured to move relative to the primary lifting surface in a second direction opposite the first direction.

4. The arrangement according to claim 3, wherein the first lifting surface is mechanically linked to the second lifting surface.

5. The arrangement according to claim 1, wherein the control system is operable in a second mode of operation in which the first and second lifting surfaces are actively controlled to change a value of lift generated by the first and second tip devices whilst maintaining a value of torque effective at the primary lifting surface about the flexural axis substantially constant.

6. The arrangement according to claim 1, wherein the first tip device has a leading edge and a trailing edge, and the first lifting surface extends full chord between the leading edge and the trailing edge of the first tip device.

7. The arrangement according to claim 6, wherein the arrangement further comprises an actuator for rotating the first lifting surface relative to the tip.

8. The arrangement according to claim 6, wherein the arrangement further comprises an actuator for morphing the first lifting surface.

9. The arrangement according to claim 1, wherein the first tip device has a leading edge and a trailing edge, the first lifting surface extends only part chord between the leading and trailing edges, and the first tip device has a third lifting surface fixed with respect to the primary lifting surface.

10. The arrangement according to claim 9, wherein the first lifting surface is hinged with respect to the third lifting surface and the first lifting surface rotates bout the hinge.

11. The arrangement according to claim 1, wherein the second tip device has a leading edge and a trailing edge, and the second lifting surface extends full chord between the leading and trailing edges of the second tip device.

12. The arrangement according to claim 11, wherein the arrangement further comprises an actuator for rotating the second lifting surface relative to the tip.

13. The arrangement according to claim 11, wherein the arrangement further comprises an actuator for morphing the second lifting surface.

14. The arrangement according to claim 1, wherein the second tip device has a leading edge and a trailing edge, the second lifting surface extends only part chord between the leading and trailing edges, and the second tip device has a fourth lifting surface fixed with respect to the primary lifting surface.

15. The arrangement according to claim 14, wherein the second lifting surface is hinged with respect to the fourth lifting surface and the second lifting surface rotates about the hinge.

16. The arrangement according to claim 1, wherein the first and second lifting surfaces each include at least one aperture, and the control system is configured to control movement of fluid through the at least one aperture of the first and second lifting surfaces to provide active circulation control.

17. The arrangement according to claim 1, wherein the first tip device is swept forwards and the second tip device is swept backwards.

18. The arrangement according to claim 1, wherein the first tip device is swept backwards and the second tip device is swept backwards.

19. The arrangement according to claim 1, wherein the first tip device is swept forwards and the second tip device is swept forwards.

20. The arrangement according to claim 1, wherein the primary lifting surface is swept backwards.

21. The arrangement according to claim 1, wherein the primary lifting surface is swept forwards.

22. The arrangement according to claim 1, wherein the primary lifting surface is unswept.

23. The arrangement according to claim 1, wherein the first tip device is located forward of the flexural axis and the second tip device is located aft of the flexural axis.

24. The arrangement according to claim 1, wherein the primary lifting surface defines a wing plane, and the first and second tip devices are substantially co-planar with the wing plane.

25. The arrangement according to claim 1, wherein the first and second tip devices are located in different planes.

26. An arrangement according to claim 25, wherein the first and second tip devices are located in intersecting planes.

27. An arrangement according to claim 25, wherein the primary lifting surface, the first tip device and the second tip device are each located in different parallel planes.

28. The arrangement according to claim 27, wherein the first tip device is mounted on a first pylon extending from the tip of the primary lifting surface, and the second tip device is mounted on a second pylon extending from the tip of the primary lifting surface.

29. The arrangement according to claim 1, wherein the primary lifting surface is one of a wing of a fixed wing aircraft, a wing of a rotary wing aircraft, a wind turbine blade, a compressor blade, a propeller or a hydrofoil.

30. A method of controlling an arrangement of lifting surfaces, the arrangement comprising:
a primary lifting surface having a flexural axis extending in a spanwise direction of the primary lifting surface, a root, and a tip;
a first tip device attached to the tip and having a first lifting surface; and a second tip device attached to the tip and having a second lifting surface, and
a control system coupled to the first and second tip devices;
the method comprising a first mode of operation which includes at least one of a) moving at least one of the first and second lifting surfaces relative to the tip, and b) actively controlling circulation of the first and second lifting surfaces,
wherein the first mode of operation changes a value of torque effective at the primary lifting surface about the flexural axis, while maintaining a substantially constant value of lift generated by the first and second tip devices.

31. The method according to claim 30, comprising moving the first lifting surface mechanically independently of the second lifting surface.

32. The method according to claim 30, comprising moving the first lifting surface relative to the primary lifting surface in a first direction, and moving the second lifting surface relative to the primary lifting surface in a second direction opposite the first direction.

33. The method according to claim 32, wherein the movement of the first lifting surface is mechanically linked to movement of the second lifting surface.

34. The method according to claim 30, further comprising a second mode of operation including moving the first and second lifting surfaces to change a value of lift generated by the first and second tip devices whilst maintaining a value of torque effective at the primary lifting surface about the flexural axis substantially constant.

35. The method according to claim 30, further comprising rotating the first lifting surface relative to the tip.

36. The method according to claim 30, further comprising rotating the second lifting surface relative to the tip.

37. The method according to claim 30, further comprising controlling movement of fluid through at least one aperture in each of the first and second lifting surfaces to provide active circulation control.

38. The method according to claim 30, wherein the arrangement of lifting surfaces is provided at each of a port side and a starboard side of an aircraft, and the method comprises changing a value of torque effective at the respective port and starboard primary lifting surfaces about their flexural axes to effect one or more of: i) roll control of the aircraft; ii) yaw control of the aircraft; iii) pitch control of the aircraft; iv) tip vortex control; and v) drag control.

* * * * *